United States Patent [19]

Fujii et al.

[11] Patent Number: 5,862,487
[45] Date of Patent: Jan. 19, 1999

[54] CHANNEL ALLOCATION FOR CO-LOCATED SYSTEMS BASED ON INTERFERRING CHANNEL GROUPS

[75] Inventors: Teruya Fujii, Yokosuka; Katsunori Hamada, Yokohama; Masaaki Yoshimi, Fujisawa, all of Japan

[73] Assignee: NTT Mobile Communications Network Inc, Tokyo, Japan

[21] Appl. No.: 700,062

[22] Filed: Aug. 19, 1996

[30] Foreign Application Priority Data

Jan. 25, 1995 [JP] Japan .................................. 7-010122
Jan. 25, 1995 [JP] Japan .................................. 7-010131

[51] Int. Cl.⁶ .................................................... H04Q 7/34
[52] U.S. Cl. ........................... 455/454; 455/513; 455/516
[58] Field of Search .................................... 455/448, 449, 455/447, 446, 450, 452, 454, 437, 509, 516, 513, 525

[56] References Cited

U.S. PATENT DOCUMENTS

| 5,276,908 | 1/1994 | Koohgoli et al. ........................ 455/454 |
| 5,363,428 | 11/1994 | Nagashima .............................. 455/452 |
| 5,384,827 | 1/1995 | Orikasa . |
| 5,452,471 | 9/1995 | Leopold et al. ........................ 455/454 |
| 5,497,503 | 3/1996 | Rydberg et al. ........................ 455/454 |
| 5,655,217 | 8/1997 | Lemson .................................. 455/450 |

FOREIGN PATENT DOCUMENTS

| 4-6919 | 1/1992 | Japan . |
| 6-269042 | 9/1994 | Japan . |

*Primary Examiner*—Nguyen Vo
*Assistant Examiner*—Lester G. Kincaid
*Attorney, Agent, or Firm*—Cushman Darby & Cushman IP Group of Pillsbury Madison & Sutro LLP

[57] ABSTRACT

A mobile communication system is provided in which a base station commands a mobile station (or field monitor) to measure the field strength for a specific channel. The mobile station reports the measured results to the base station. The measured results are used in conjunction with base station identification codes to obtain a single representative value which is used to determine what channels can be selected and used by the system. This enables an existing cellular system to be utilized as a first mobile communication system, and makes it possible to construct a second mobile communication system in the same area as the service area of the first system.

9 Claims, 20 Drawing Sheets

First Embodiment e. g. :color code

Second Embodiment

| base station ID code | channel number | downlink received level | processing of downlink received level (mean value) | estimate of uplink interference level | decision |
|---|---|---|---|---|---|
| 1 | 1 | 10 | 5 | 8 | can use |
|   | i | 5 |   |   |   |
|   | N | 0 |   |   |   |
| 2 | 3 | 5 | 15 | 18 | cannot use |
| 3 |   |   |   |   | can use |

Fig.21

| channel number | downlink received level | decision |
|---|---|---|
| 1 | 10 | cannot use |
| 2 | 35 | cannot use |
| 3 | 5 | can use |
|   |   |   |
| i | 5 | can use |
|   |   |   |
|   |   |   |
| N | 0 | cannot use |

CHANNEL ALLOCATION FOR CO-LOCATED SYSTEMS BASED ON INTERFERRING CHANNEL GROUPS

BACKGROUND OF THE INVENTION

1. Field of the Invention

This invention relates to a mobile communication system which forms a micro-cell in the same area as the service area of a cellular system, and which selects, from the same frequency band that is allocated to the cellular system, channels that do not give rise to interference problems, and then shares their frequencies within the micro-cell.

2. Description of the Related Art

A mobile communication system which forms a microcell in the same area as the service area of an already constructed cellular system, and which shares the same frequency band, has been considered. Prior art examples of this sort are illustrated in FIG. 1 to FIG. 3.

FIG. 1 shows an arrangement of base stations, with an existing cellular system (hereinafter, termed "system A") forming service area 102 from a plurality of radio zones centering on base stations 101. The radio band allocated to this system is divided into a plurality of channel groups, and these are re-used in radio zones separated by a prescribed distance. Also deployed in service area 102 is base station 103 of a different system from system A, or of a system which, although the same as system A, can operate independently (hereinafter, termed "system B"). Base station 103 forms service area 104 and can select, from the same frequency band that is allocated to system A, channels that do not give rise to mutual interference problems, and can then re-use these channels.

FIG. 2 serves to explain mutual interference. Mutual interference has to be taken into account when base station 103 selects channels. There are four kinds of mutual interference relating to base station 101 of system A, mobile station 105 of system A, base station 103 of system B and mobile station 106 of system B. Namely:

(a) uplink interference from mobile station 106 of system B, affecting base station 101 of system A;

(b) downlink interference from base station 103 of system B, affecting mobile station 105 of system A;

(c) uplink interference from mobile station 105 of system A, affecting base station 103 of system B;

(d) downlink interference from base station 101 of system A, affecting mobile station 106 of system B.

The four kinds of mutual interference noted above have to be taken into account in order to select channels that do not give rise to mutual interference problems. Hitherto, however, the following simplified method has been used. Namely, field monitors are disposed in the service area of system B and these measure the level of downlink interference from base stations 101 of system A on mobile station 106 of system B, i.e., the interference level in case (d) above. According to this simplified method, which is illustrated in FIG. 3, a plurality of field monitors 107 are set up in service area 104 of system B, these field monitors 107 being capable of measuring the received level from base stations 101 of system A. On the basis of instructions from base station 103 of system B, these field monitors 107 measure the received level at all frequencies (channels) used by system A and report the results of these measurements to base station 103. Having received these reports from field monitors 107, base station 103 takes into account differences in transmitted power, differences in feeder loss, etc. between the uplink and the downlink, and estimates, from the measured downlink levels, the interference level in case (a) above, i.e., the level of uplink interference from mobile station 106 of system B on base stations 101 of system A. Then, on the basis of this result, base station 103 selects channels that can be used.

FIG. 4 shows a detailed configuration of base station 103 and field monitor 107. Base station 103 has transceiver 111 for communicating with mobile stations, and base station controller 112. Field monitor 107 has field monitoring receiver 113 and received level detector 114 for measuring the received level from base stations of system A, plus controller 115 which decides from the received levels which channels can be used. Controller 115 measures the received level at all frequencies (channels) used by system A, and from these values estimates the levels of uplink interference on base stations of system A. It then compares these with a predetermined level threshold, and if an estimated interference level does not exceed a threshold, controller 115 decides that it does not cause interference at a corresponding base station of system A. Controller 115 then notifies base station controller 112 that it can use that channel. Base station controller 112 sets the channel to be used by transceiver 111 to the one notified by controller 115.

However, a drawback of this method is that in order to measure the downlink interference level accurately, it is necessary to deploy a large number of field monitors so as to ensure complete coverage of the area, with the result that setup costs are very high. Restricting the number of field monitors by deploying them at essential locations only, e.g., within the base station, has been considered, but the drawback here is that, conversely, it becomes difficult to select suitable deployment positions.

The object of the present invention is to provide a mobile communication system which overcomes this problem and significantly increases the accuracy of interference level measurement, without the need for special field monitors for measuring the level of downlink interference from the base stations of an existing system.

BRIEF SUMMARY OF THE INVENTION

According to a first aspect, this invention provides a mobile communication system including: a first group of base stations belonging to a first mobile communication system; the service area of the first mobile communication system consists of a plurality of radio zones, each centered on a base station of this first group; and a second group of base stations belonging to a second mobile communication system independent of the first mobile communication system is provided in the service area of this first mobile communication system. Each of the base stations of this second group includes: a means which selects control channels and traffic channels from among channels in which the level of mutual interference involving base stations of the first group and the other base stations of the second group is within a predetermined value; and a means which allocates the selected channels to mobile stations which belong to the second mobile communication system and which are located within that base station's area. The mobile communication system further includes a selecting means which includes a means which specifies channels for mobile stations and commands field strength measurements and a means which receives from these mobile stations information relating to the results of the field strength measurements of the specified channels. A mobile station belonging to the second mobile communication system has a means which tunes the received frequency to the channel specified by the command means and measures its field strength, and a means which reports the measured results to the receiving means.

In other words, after a base station has specified, via a downlink control channel or traffic channel, a channel on which a mobile station located in its area should measure the received level, and the mobile station has received a measurement instruction, the mobile station uses the received level measurement function commonly possessed by a mobile station to measure the received level of the specified channel (frequency) and reports the result to the base station via an uplink control channel or traffic channel. This enables an existing cellular system to be utilized as a first mobile communication system, and makes it possible to construct a second mobile communication system in the same area as the service area of this first system.

The radio band that can be used by the first mobile communication system is divided into a plurality of channel groups which are allocated to the first group of base stations in such manner that they can be re-used in mutually separated radio zones, and each of the first group of base stations can include a transmitting means which gives each channel a base station identification code for identifying that base station. In this case, a mobile station belonging to the second mobile communication system can include: a means which demodulates radio signals from the first group of base stations and identifies their base station identification codes, and a means which employs a reporting means to transmit to the receiving means the identified base station identification codes, along with the results measured by the means which measures the field strength. The selecting means can include: a means which, on the basis of the base station identification codes received by the receiving means, groups these radio signal channels according to the base stations which use them, and which for each group performs operations on the field strengths measured in channels belonging to that group, and thereby obtains a single representative value; and a means which decides, in channel group units, and on the basis of the representative value obtained by this means, which channels can be selected and used. In virtue of this configuration, when the uplink interference level is estimated from the downlink interference level when the received level fluctuations are characteristic of a selective fading environment, the uplink margin that is added can be restricted to a necessary minimum, and as many radio channels as possible can be used by the base stations of the newly constructed system.

Statistical values such as the mean or the 50% median can be used as the aforementioned representative value.

The selecting means may be constituted so as to be capable of deciding, in channel units, and from the measured value of the field strength of each channel, whether or not a channel can be selected and used. The selecting means should preferentially decide in channel units when the identification means has identified another base station identification code, or when the difference between the field strength newly measured for a given channel and the field strength of that channel as measured the previous time exceeds a predetermined threshold.

A constitution which decides, in channel group units, whether or not channels can be selected and used, can be implemented independently from the first aspect described above. Namely, according to a second aspect of this invention, there is provided a mobile communication system including a first group of base stations belonging to a first mobile communication system. The service area of the first mobile communication system consists of a plurality of radio zones, each centered on a base station of this first group. The radio band that can be used by the first mobile communication system is divided into a plurality of channel groups which are allocated to the first group of base stations in such manner that they can be re-used in mutually separated radio zones. Each of this first group of base stations includes a transmitting means which gives each channel a base station identification code for identifying that base station. A second group of base stations belonging to a second mobile communication system independent of the first mobile communication system is provided in the service area of the first mobile communication system. Each of the base stations of this second group includes: a means which selects control channels and traffic channels from among channels in which the level of mutual interference involving base stations of the first group and the other base stations of the second group is within a predetermined value, and a means which allocates the selected channels to mobile stations which belong to the second mobile communication system and which are located within that base station's area. A field monitoring means is connected to the selecting means and includes: means which demodulates the radio signals from the first group of base stations and identifies their base station identification codes; means which on the basis of the identified base station identification codes groups these radio signal channels according to the base stations which use them, and which for each group performs operations on the field strengths measured in channels belonging to that group, and thereby obtains a single representative value; and means which decides, in channel group units, and on the basis of the representative value obtained by this means, whether or not a channel can be selected and used.

The field monitoring means can also have a means which decides in channel units, and from the measured value of the field strength of each channel, whether or not a channel can be selected and used; and a means which causes the decision means to operate preferentially in channel units when the field monitor starts up or after it has been reset, and which subsequently causes the decision means to operate preferentially in units of a plurality of channels. In this case, the means which causes these preferential operations can comprise a means which causes the decision means to operate preferentially in channel units either when an existing base station which the identifying means has identified has changed, or when the difference between the field strength newly measured for a given channel and the field strength of that channel measured the previous time exceeds a predetermined threshold.

BRIEF DESCRIPTION OF THE DRAWINGS

FIG. 21 shows an example of a table showing whether or not channels can be used.

DETAILED DESCRIPTION OF THE INVENTION

Figure 5:
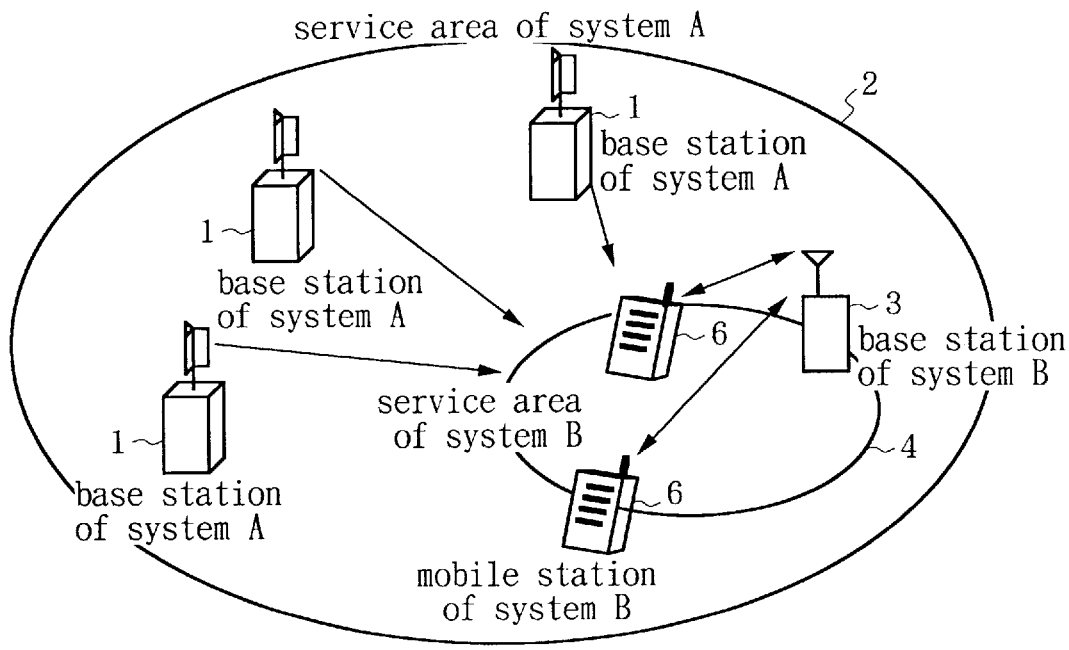
FIG. 5 shows the configuration of a mobile communication system according to a first embodiment of this invention.
Figure 6:
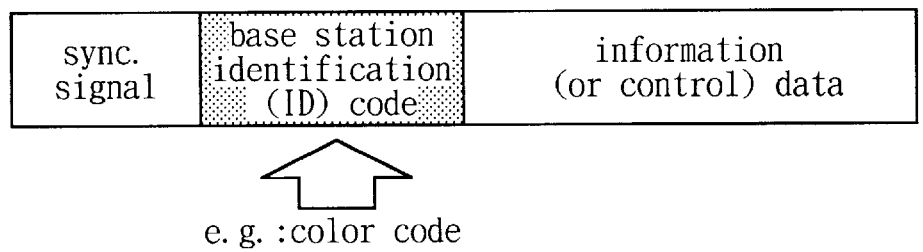
FIG. 6 shows an example of control channel and traffic channel signal formats in an existing cellular system.

FIG. 5 shows the configuration of a mobile communication system according to a first embodiment of this invention, while FIG. 6 shows an example of control channel and traffic channel signal formats of an existing cellular system.

This mobile communication system has, within service area 2 of an existing cellular system, base station 3 which is set up independently of this cellular system. This base station 3 is capable of selecting, from the same frequency band that is allocated to the cellular system, channels that do not give rise to mutual interference problems, and it can allocate the selected channels to mobile stations 6 located within the radio zone of base station 3. The selection of channels by base station 3 is performed by specifying channels on which mobile station 6 should measure the field strength, and then receiving information from this mobile station 6 relating to the results of the field strength measurements on the specified channels. Mobile stations 6 tune the received frequency to a specified channel, measure its field strength, and report the result of the measurement to base station 3.

Hereinafter, the cellular system which provides service area 2 will be called "system A" and the mobile communication system to which base station 3 belongs will be called "system B". System A may for example be the digital mobile phone system stipulated in Personal Digital Cellular Telecommunication System RCR Standard 27 of the Research & Development Centre for Radio Systems, and currently providing service in Japan. System B may be a partially modified version of this digital mobile phone system.

A plurality of base stations 1 belonging to system A (in FIG. 5 these are labelled "base station of system A") are provided in service area 2, which comprises a plurality of radio zones centered on base stations 1. The radio band allocated to system A is divided into a plurality of channel groups and these are re-used in radio zones separated by a prescribed distance. Each base station 1 has a control channel for controlling the connection of outgoing and incoming calls, and a traffic channel for communication. As illustrated in FIG. 6, these channels contain base station identification codes for identifying individual base stations 1. A traffic channel also contains information data, while a control channel also contains control data including information specific to an individual base station, such as transmitting power. The color codes established in Personal Digital Cellular Telecommunication System RCR Standard 27 of the Research & Development Centre for Radio Systems can for example be used as the base station identification codes. All the control channels and traffic channels comprise a downlink channel on which the base station transmits and the mobile station receives, and an uplink channel on which the mobile station transmits and the base station receives.

The radio zone of base station 3 of system B is set up to be smaller than the radio zones of base stations 1 of system A. For simplicity, in the example shown in FIG. 5 there is one base station 3, and its radio zone is taken to be service area 4 of system B.

Figure 7:
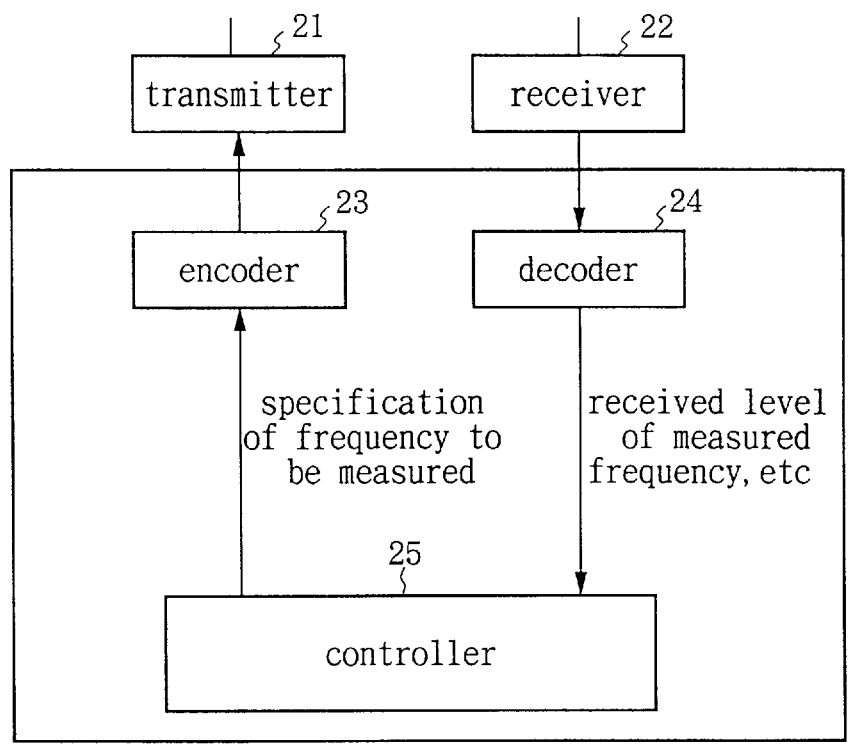
FIG. 7 is a block diagram showing an example of the configuration of a base station.
Figure 8:
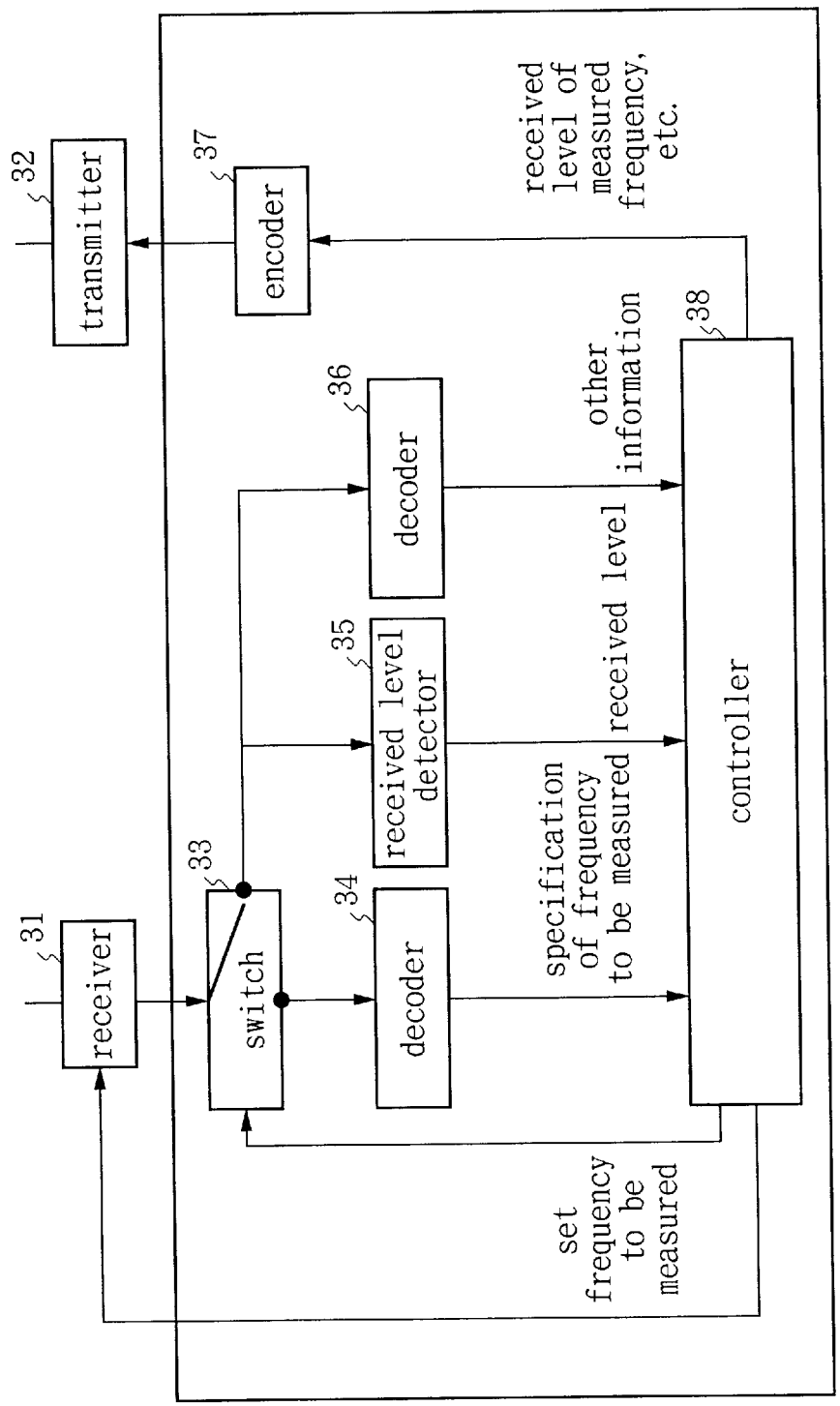
FIG. 8 is a block diagram showing an example of the configuration of a mobile station.

FIG. 7 is a block diagram showing an example of a configuration of base station 3, while FIG. 8 is a block diagram showing an example of a configuration of mobile station 6. Base station 3 comprises, in addition to transmitter 21 and receiver 22 for carrying out communication: encoder 23 which encodes the channel number signal, decoder 24 which decodes the level information and other signals that have been transmitted from a mobile station, and controller 25 which performs overall control. Mobile station 6 comprises, in addition to receiver 31 and transmitter 32 for carrying out communication: decoder 34 for decoding the channel number signal that has been transmitted from base station 3, the channel number signal indicating the number of the channel which has to be measured; received level detector 35 for monitoring the channels of system A; decoder 36 for decoding the signals contained in these channels, e.g. color codes and so forth; switch 33 which switches the output of receiver 31 between decoder 34 on the one hand and received level detector 35 and decoder 36 on the other; encoder 37 which encodes color codes and other signals and outputs them to transmitter 32; and controller 38 which performs overall control.

Figure 9:
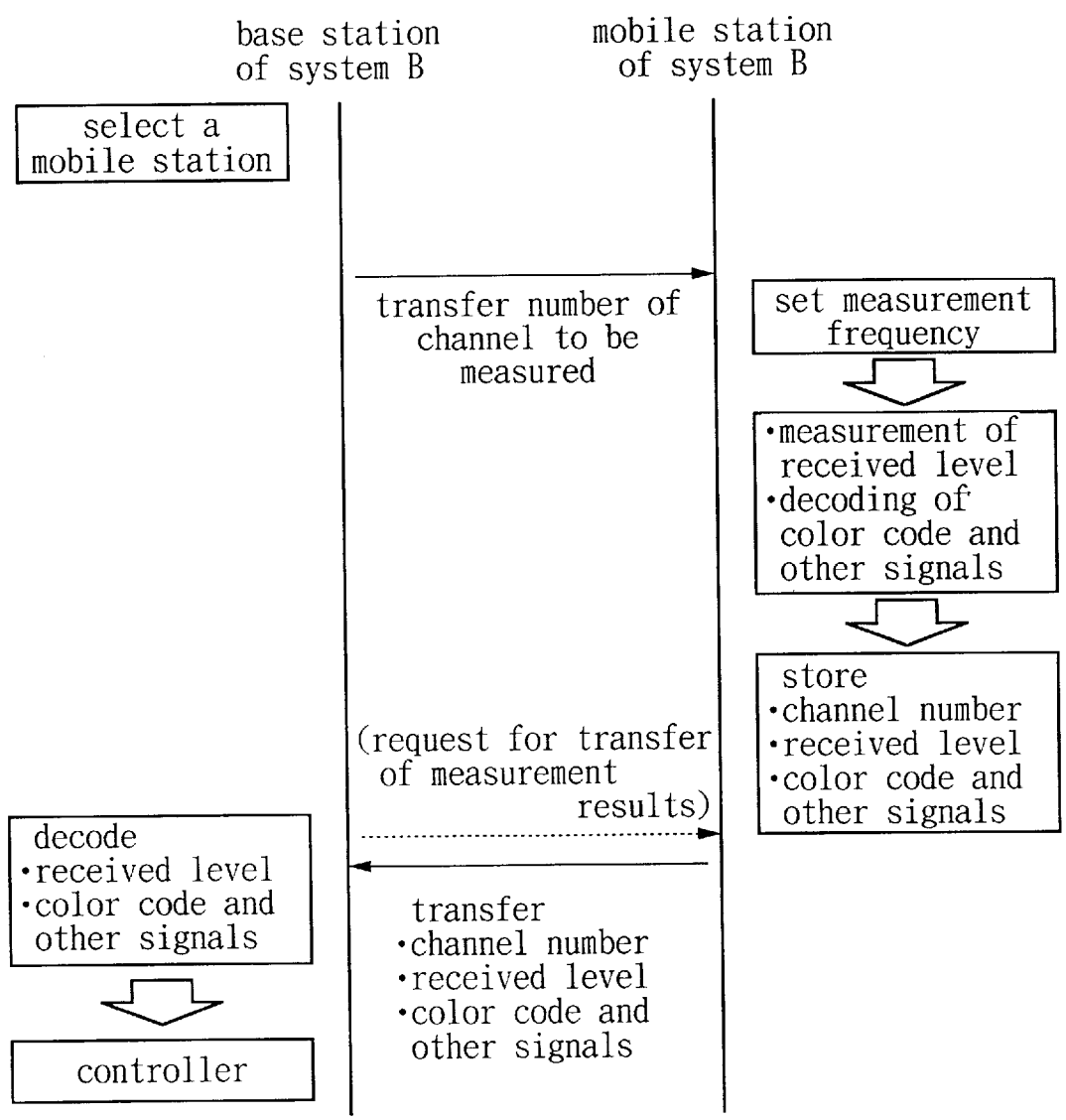
FIG. 9 illustrates the specific control actions involved.

FIG. 9 serves to explain the specific actions involved between the base and mobile stations. These actions will now be explained with reference to FIGS. 6–8.

(1) First of all, base station 3 of system B selects a mobile station 6 located within service area 4 of system B.

(2) Base station 3 sends a reception level measurement request to the selected mobile station 6 by way of a downlink control channel or traffic channel. This reception level measurement request specifies the number of the channel (frequency) to be measured.

(3) When mobile station 6 has received the instruction to measure the received level, an instruction from controller 38 serves to tune the frequency which receiver 31 can receive to that of the specified channel number. Mobile station 6 then measures the received level from a base station 1 of system A by means of received level detector 35 and stores this in a memory inside controller 38 along with the channel number. At the same time, it employs decoder 36 to decode the color code and other signals contained in the measured channel and stores these signals in the memory inside controller 38.

(4) Controller 38 transmits the channel number, received level, color code and so forth to base station 3 via encoder 37 and transmitter 32, either autonomously or in accordance with a transmission instruction from base station 3.

(5) Base station 3 decodes the contents of the transmission from mobile station 6 and records the result in a memory in controller 25 along with the channel number.

(6) Controller 25 also takes into account differences in transmitted power, differences in feeder loss, etc. between the uplink and the downlink, and estimates, from the downlink received level of each measured channel, the level of uplink interference from mobile station 6 of system B on base station 1 of system A, and selects the channels that can be used.

The broken line in FIG. 9 shows the case where the measurement results are transferred on the basis of a request from base station 3.

The channel used to transfer signals between base station 3 and mobile station 6 differs according to whether mobile station 6 is on standby or is busy. The explanation given here is based on the signal transfer method stipulated in Personal Digital Cellular Telecommunication System RCR Standard 27 of the Research & Development Centre for Radio Systems. When mobile station 6 is on standby, a signaling control channel (SCCH) is used to transmit the reception level measurement request and to send back channel numbers, received levels, color codes and so forth. Normally, a mobile station on standby receives the paging channel (PCH) intermittently, while the signaling control channel is received only at restricted times such as during location registration. For this reason, transmission of a reception level measurement request from base station 3 has to be carried out when mobile station 6 is receiving the signaling control channel. Assuming for example that mobile station 6 registers its location at fixed time intervals, it is then desirable to transmit the reception level measurement request from the base station during location registration, when the mobile station is capable of receiving SCCH. When mobile station 6 is busy, a fast associated control channel (FACCH) is used to transmit the reception level measurement request and to send back channel numbers, received levels, color codes and so forth.

Figure 10:
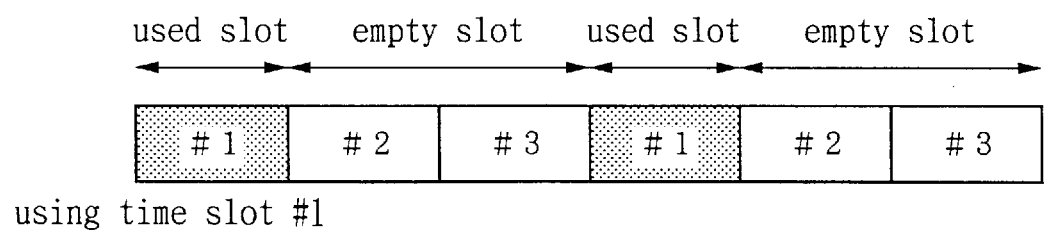
FIG. 10 illustrates measurements at a mobile station in a TDMA system, and shows a 3-channel TDMA signal format.

FIG. 10 serves to explain measurements at a mobile station in a TDMA system, and shows a 3-channel TDMA signal format. In TDMA, slots that are not used by a mobile station are present whether the mobile is busy or on standby. If this time is utilized to measure the field strength of a specified channel, the communication of the selected mobile station will not be impeded.

Figure 11:
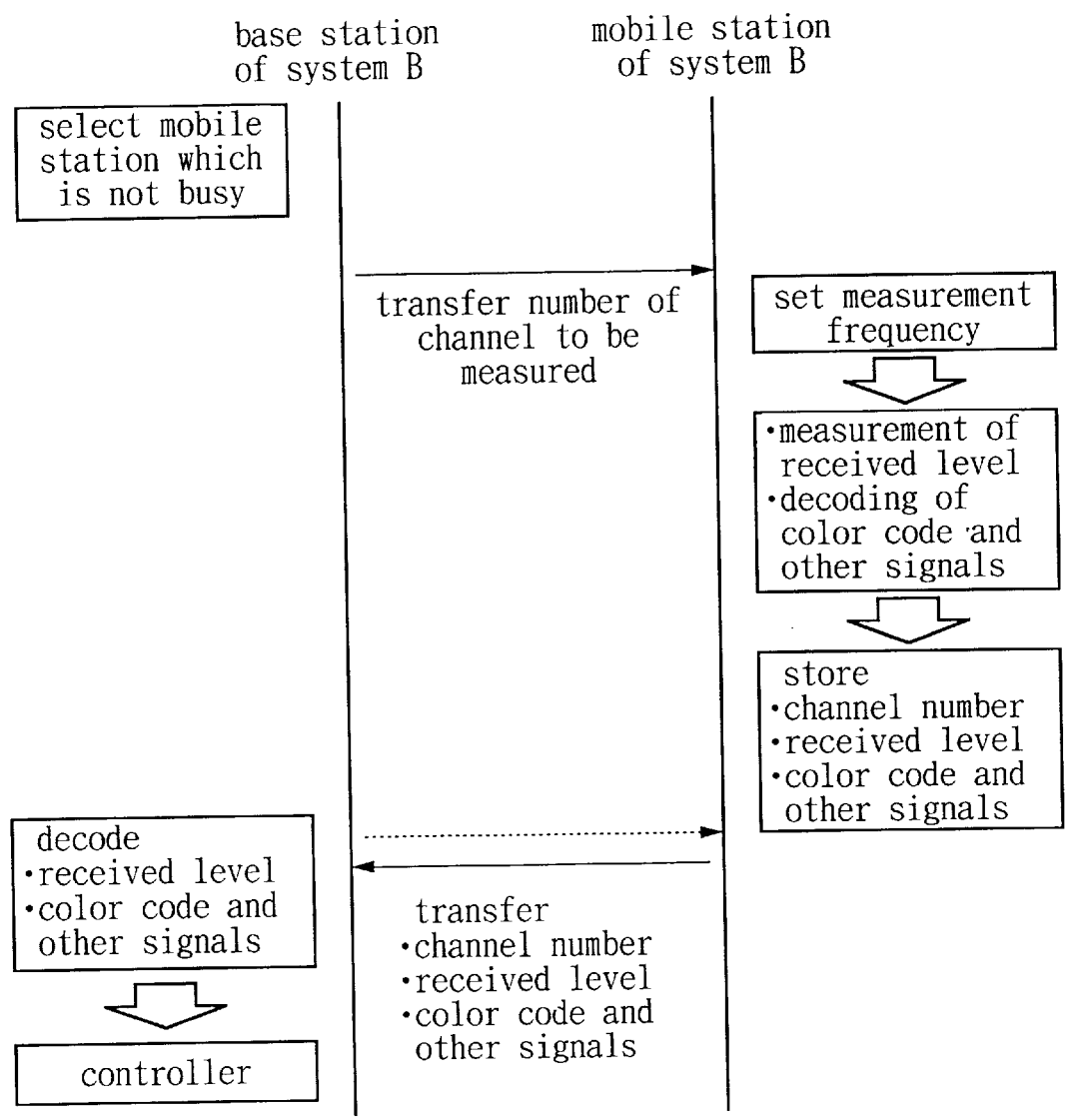
FIG. 11 illustrates measurements in an FDMA system.
Figure 12:
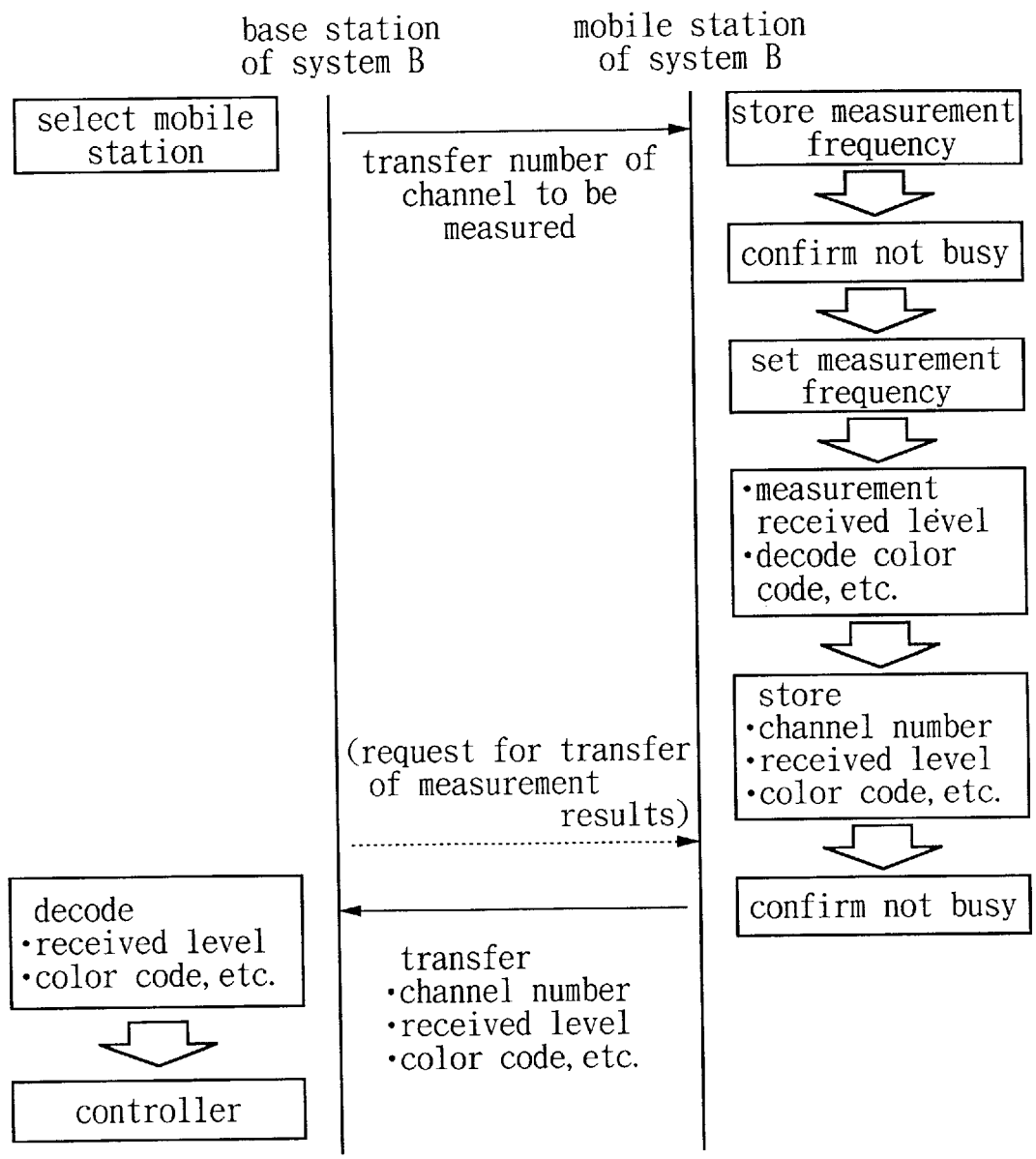
FIG. 12 illustrates measurements in an FDMA system.

FIG. 11 and FIG. 12 serve to explain measurements in an FDMA system. In FDMA, receiving generally goes on constantly while a mobile station is communicating, and therefore if measurements of the field strength of a specified channel are carried out while the mobile station is communicating, the communication will be impeded during these measurements. Therefore in the case of FDMA, as shown in FIG. 11, the base station of system B selects a mobile station which is on standby and is not communicating, and causes this mobile station to perform measurements. Alternatively, as shown in FIG. 12, the mobile station stores the specified channel number and measures the received level of the channel corresponding to the specified channel number when the mobile station is on standby and is not communicating. The broken line in FIG. 12 shows the case where the measurement results are transferred on the basis of a request from the base station.

The foregoing explanation relates to an example in which field strength measurement at the mobile station is accompanied by decoding the color code and other signals at the mobile station. However, in order to simplify the device configuration and the measurements, it is also feasible to measure just the field strength.

Thus, because field strength is measured by the mobile stations, fixed field monitors are not required at all. Moreover, because the mobile stations move around within the service area of system B, information relating to the interference level of system A can be obtained throughout substantially the whole of the area, with the result that the effect obtained is the same as when a large number of field monitors are deployed so as to ensure complete coverage of the area.

Because the embodiment explained above uses mobile stations located within the service area as field monitors, it is not necessary to set up any fixed field monitors at all, and the embodiment is therefore economically advantageous. Further, because the mobile stations can move over the whole length and breadth of the area, the same level of measurement accuracy can be obtained as when fixed field monitors are set up throughout the area, and accurate selection of channels that do not result in interference can be achieved.

Figure 13:
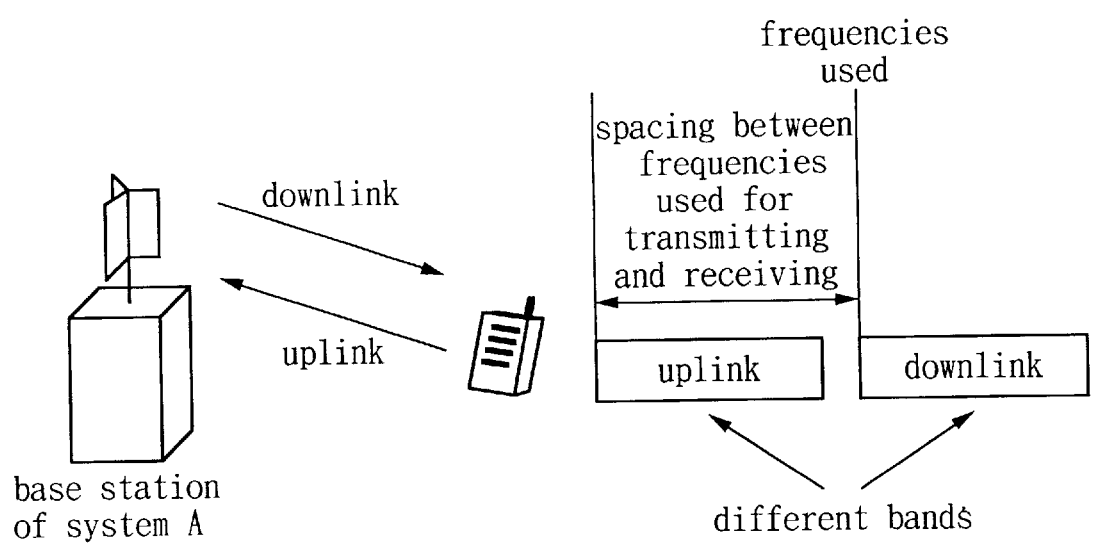
FIG. 13 illustrates the frequency bands used for the uplink and the downlink.

In the foregoing explanation it was assumed that the level of uplink interference from a mobile station of system B to a base station of system A can be estimated from the measured value of the level of downlink interference from the base station of system A to that mobile station. However, when the frequency band used for uplinks (i.e., when the mobile station transmits and the base station receives) is different from the frequency band used for downlinks (i.e., when the base station transmits and the mobile station receives), as shown in FIG. 13, the influence of selective fading means that simply estimating the uplink interference level from the downlink interference level will not always produce an accurate result. An example of this sort will now be explained.

Figure 14:
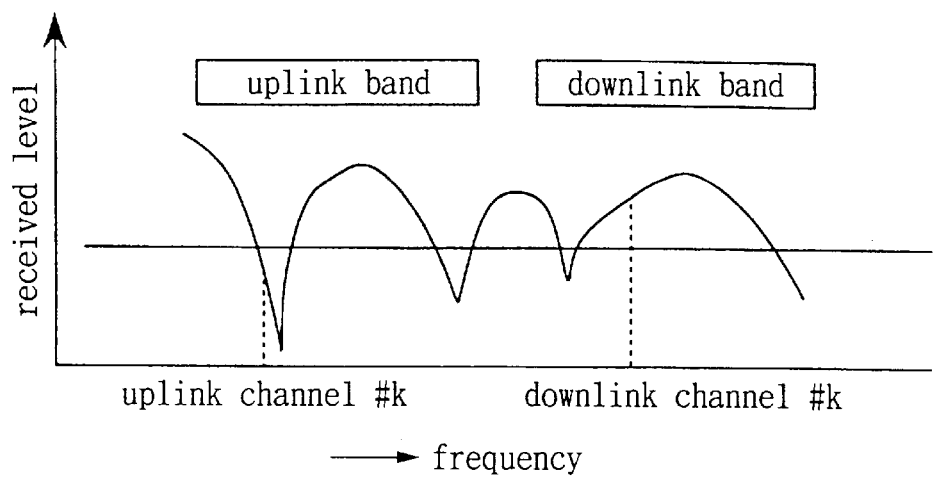
FIG. 14 illustrates selective fading.

In mobile communication, radio waves reflected by various buildings arrive at the receiving point with different delays. Consequently, as shown in (d) of FIG. 2, if radio waves transmitted from a base station of system A are received by a mobile station of system B, the received level will vary from one channel (frequency) to another. An example of this is shown in FIG. 14. This is generally called "selective fading", and the fluctuations vary according to the delay difference of the radio waves reaching the receiving point. The amplitude of the fluctuation may be as high as several tens of dB, which is very large. For this reason, in a system of the sort shown in FIG. 13, where the frequency band used by the uplink (mobile station transmitting, and base station receiving) differs from that used by the downlink (base station transmitting, and mobile station receiving), it is very difficult to make an accurate estimation of the received level of an uplink by measuring the received level of the corresponding downlink.

Figure 1:
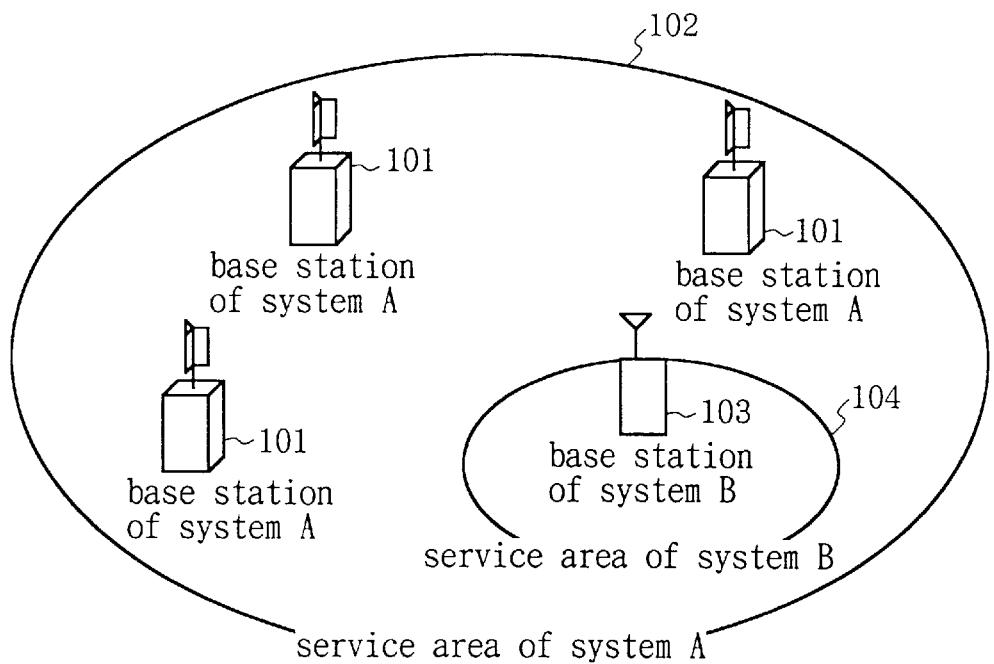
FIG. 1 illustrates the prior art and shows an arrangement of base stations.
Figure 2:
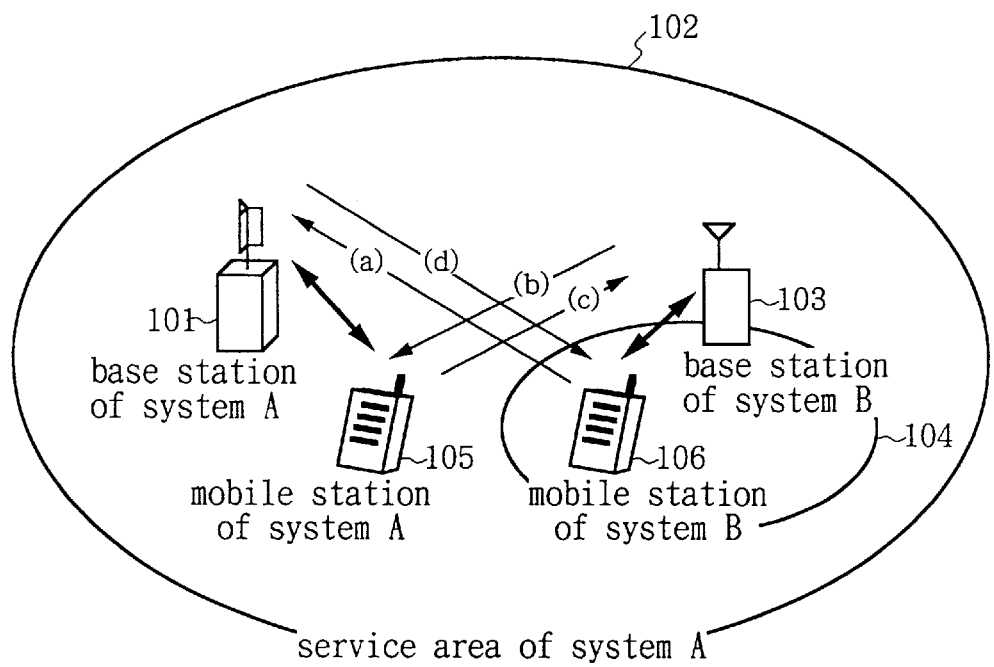
FIG. 2 illustrates mutual interference in the base station arrangement illustrated in FIG. 1.
Figure 3:
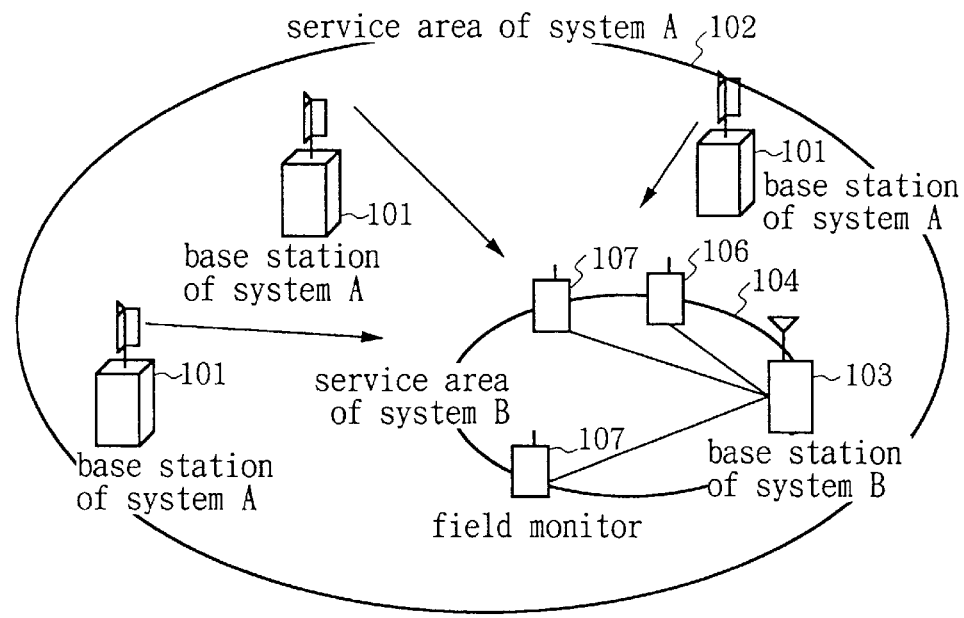
FIG. 3 shows a prior art method for measuring downlink interference levels.
Figure 4:
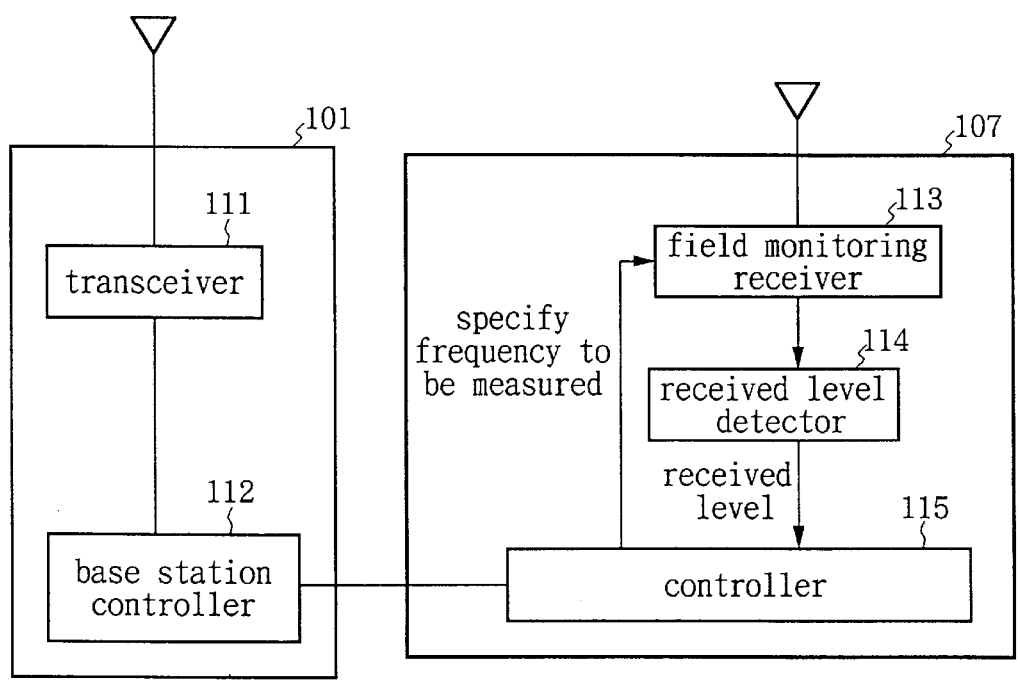
FIG. 4 is a block diagram showing an example of the configuration of a prior art base station for the case where the downlink interference level is measured within the base station.
Figure 15:
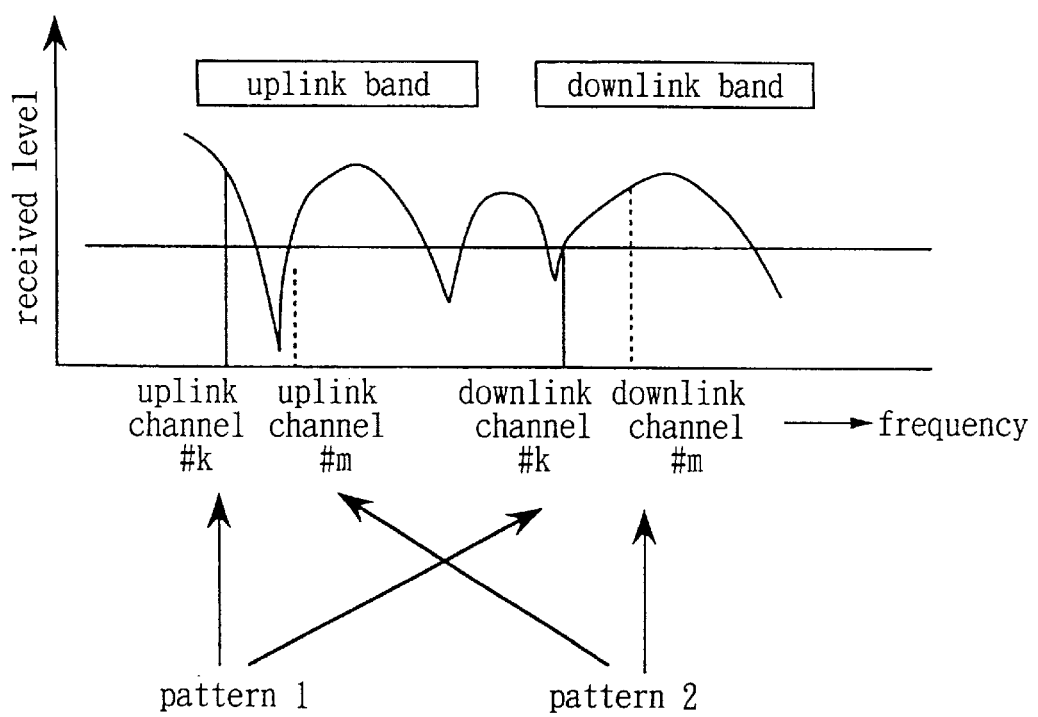
FIG. 15 illustrates differences between the uplink and downlink received levels for the same channels.

For example, when the uplink interference level (a) in FIG. 2 is estimated using the downlink interference level shown by (d), a large estimation error may sometimes occur, and this will result in significant interference at a base station of system A. It is therefore necessary to anticipate the size of this error in advance and on this basis to correct the estimated value. For example, when an interfering signal from one and the same base station affects different channels (frequencies), the downlink interference level will sometimes be small and the uplink interference level large, and conversely the downlink interference level will sometimes be large and the uplink interference level small. For this reason, when estimating the uplink interference level from the downlink interference level, it is necessary to take such fluctuations fully into account if an attempt is to be made to make the interference affecting the base stations of system A as small as possible for all channels. For example, assuming that pattern 1 shown in FIG. 15 occurs, i.e., the downlink interference level is large and the uplink interference level is small, then a large difference can be anticipated between the uplink and the downlink. However, if too large a difference is anticipated, then there will be cases where the estimated value is much larger than the actual uplink interference level, as in the case of pattern 2 in FIG. 15, i.e., where the downlink interference level is small and the uplink interference level is large. In such cases, although the channel in question could in fact be used, it will be decided that it cannot be used.

In other words, if it is supposed that the received level fluctuation width of a downlink channel is 20 dB, then a maximally stringent assessment would require the uplink margin equally to be 20 dB, so that the level of the uplink interference acting on a base station of system A will be the value obtained by adding 20 dB indiscriminately to the received level of each channel measured at the mobile station of system B. This means that the decision regarding whether or not a channel can be used is being made by comparing the estimated uplink interference level, obtained by adding the uplink margin indiscriminately to the measured downlink interference level, with the level threshold. Therefore, because for some channels the uplink margin may be excessive, it will sometimes be decided that a channel cannot be used even though in fact it could be used as a non-interfering channel. The end result is a decrease in the number of channels that can be used by system B.

Accordingly, instead of deciding whether or not a channel can be used by estimating the uplink interference level for that individual channel, the uplink interference level should be estimated collectively for each base station and the decision as to whether or not a channel can be used should be made in units of base stations. Namely, in a mobile communication system where the received level is subject to selective fading, when the downlink interference level from a base station of an existing system is measured and the level of the uplink interference affecting this base station of the existing system is estimated from this measured value, the radio channels used by the same base station are specified, a representative value, e.g., a mean value, is obtained for the downlink interference level received on these channels, an uplink margin is added to this value, and the uplink interference level is estimated collectively for each base station as a basic unit. An embodiment of this kind will now be explained.

Figure 16:
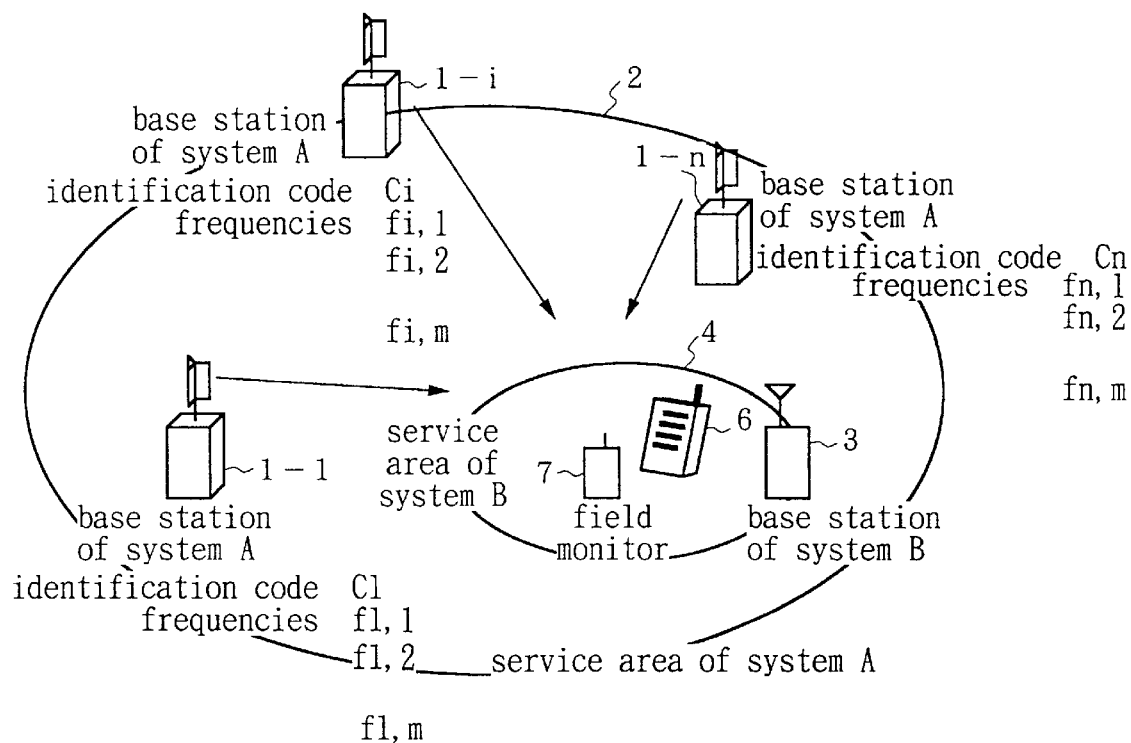
FIG. 16 shows the configuration of a mobile communication system according to a second embodiment of this invention.

FIG. 16 shows the configuration of a mobile communication system according to a second embodiment of this invention.

A mobile communication system according to this embodiment has, within service area 2 of an existing cellular system such as a mobile phone or portable phone system, base station 3 which is set up independently of this cellular system. This base station 3 is capable of selecting, from the same frequency band that is allocated to the cellular system, channels that do not give rise to mutual interference problems, and it can allocate the selected channels to mobile station 6 located within the radio zone of base station 3. Here, as in the first embodiment, the cellular system that provides service area 2 will be called "system A" and the mobile communication system to which base station 3 belongs will be called "system B".

A plurality of base stations 1-1, . . . , 1-n belonging to system A (in FIG. 16 these are labelled "base station of system A") are provided in service area 2, which comprises a plurality of radio zones centering on each of these. The radio band allocated to system A is divided into a plurality of channel groups, and these are re-used in radio zones (base stations 1-1, . . . , 1-n) separated by a prescribed distance. Each base station 1-1, . . . , 1-n has a control channel for controlling the connection of outgoing and incoming calls, and a traffic channel for communication. Base station identification codes of the sort shown in FIG. 6 are inserted in these channels.

The radio zone of base station 3 is set up to be smaller than the radio zones of base stations 1-1, . . . , 1-n of system A. For simplicity, in the example shown in FIG. 16, there is one base station 3 of system B, and the radio zone of this single base station 3 is taken to be service area 4 of system B. Within the radio zone of base station 3 there is provided field monitor 7 which monitors the radio waves transmitted from base stations 1-1, . . . , 1-n of system A. This field monitor 7 decodes the radio signals received from system A and thereby identifies the base stations 1-1, . . . , 1-n which have transmitted these radio signals. It then specifies the plurality of channels being used by a given base station and obtains the mean value of the interference level received on these channels. Then, on the basis of this mean value obtained by field monitor 7, base station 3 decides, in channel group units, whether or not a channel can be selected and used.

As in the first embodiment, field monitor 7 is preferably implemented as a function of the mobile stations, but it can also be implemented as a separate device from the mobile stations. Here, it will be explained as a separate device from the mobile stations. When field monitor 7 is implemented as a separate device from the mobile stations, it may be deployed at a separate location from base station 3, or it may be set up at the same location as base station 3.

Here, the base station identification codes of base stations 1-1, . . . , 1-n will be written as C1-Cn. To simplify the explanation, the number of channels respectively allocated to base stations 1-1, . . . , 1-n will be assumed to be the same number m in each case. The frequencies of these channels will be written as $f1,i \ldots fn,i$ and their received levels as $E1,i \ldots En,i$, where i corresponds to the channel number and i=1, . . . , m. The total number of channels allocated to system A will be written as N and their channel numbers will be written as j (=1, 2, . . . , N).

Figure 17:
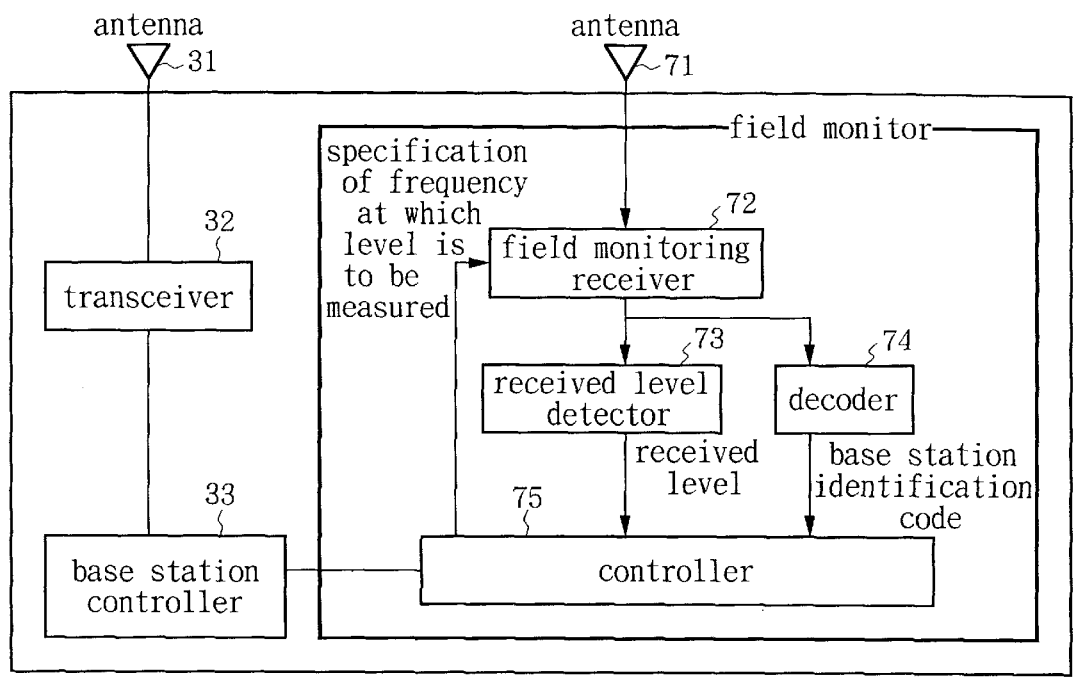
FIG. 17 is a block diagram showing an example of a configuration wherein the base station and the field monitor are installed in a common facility.
Figure 18:
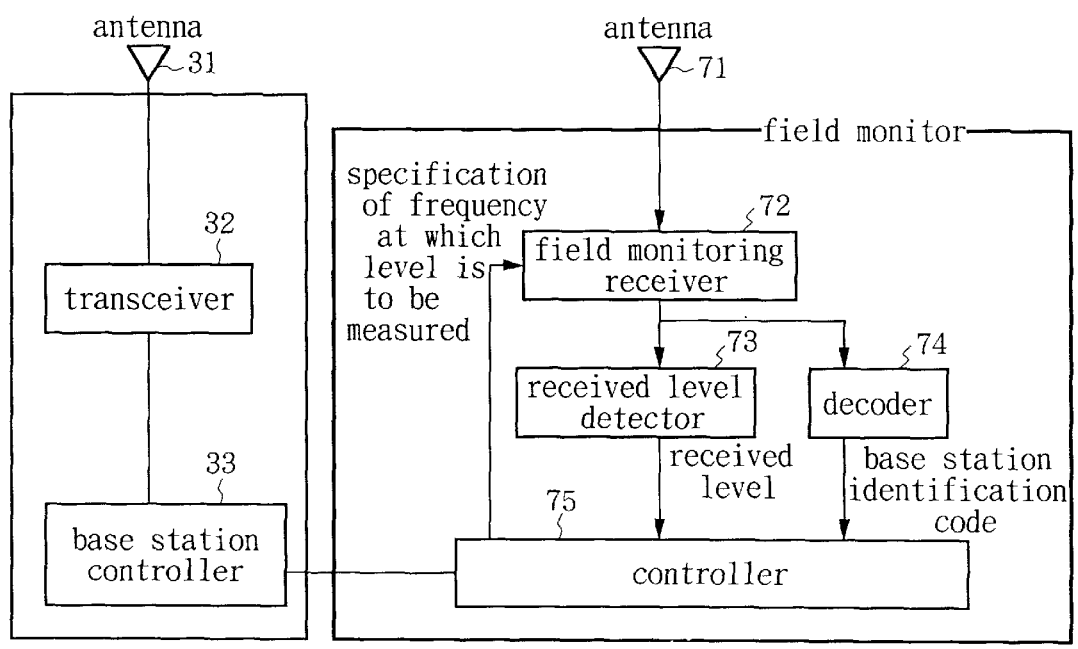
FIG. 18 is a block diagram showing an example of a configuration wherein the base station and the field monitor are set up separately.

FIG. 17 and FIG. 18 show examples of two configurations for base station 3 and field monitor 7. In the configuration shown in FIG. 17, base station 3 and field monitor 7 are installed in a common facility, while in the configuration shown in FIG. 18 they are set up separately. In both cases, antenna 31, transceiver 32 and base station controller 33 are provided as base station 3; and antenna 71, field monitoring receiver 72, received level detector 73, decoder 74 and controller 75 are provided as field monitor 7. Transceiver 32 serves for communication with mobile stations of system B, and is controlled by base station controller 33. Field monitoring receiver 72 receives downlinks from base stations of system A, and received level detector 73 measures their received level. Decoder 74 decodes the base station identification code from the received signal from field monitoring receiver 72. In the example given in FIG. 17, antenna 31 of transceiver 32 and antenna 71 of field monitoring receiver 72 are provided separately, but it is also possible for these to be shared.

Figure 19:
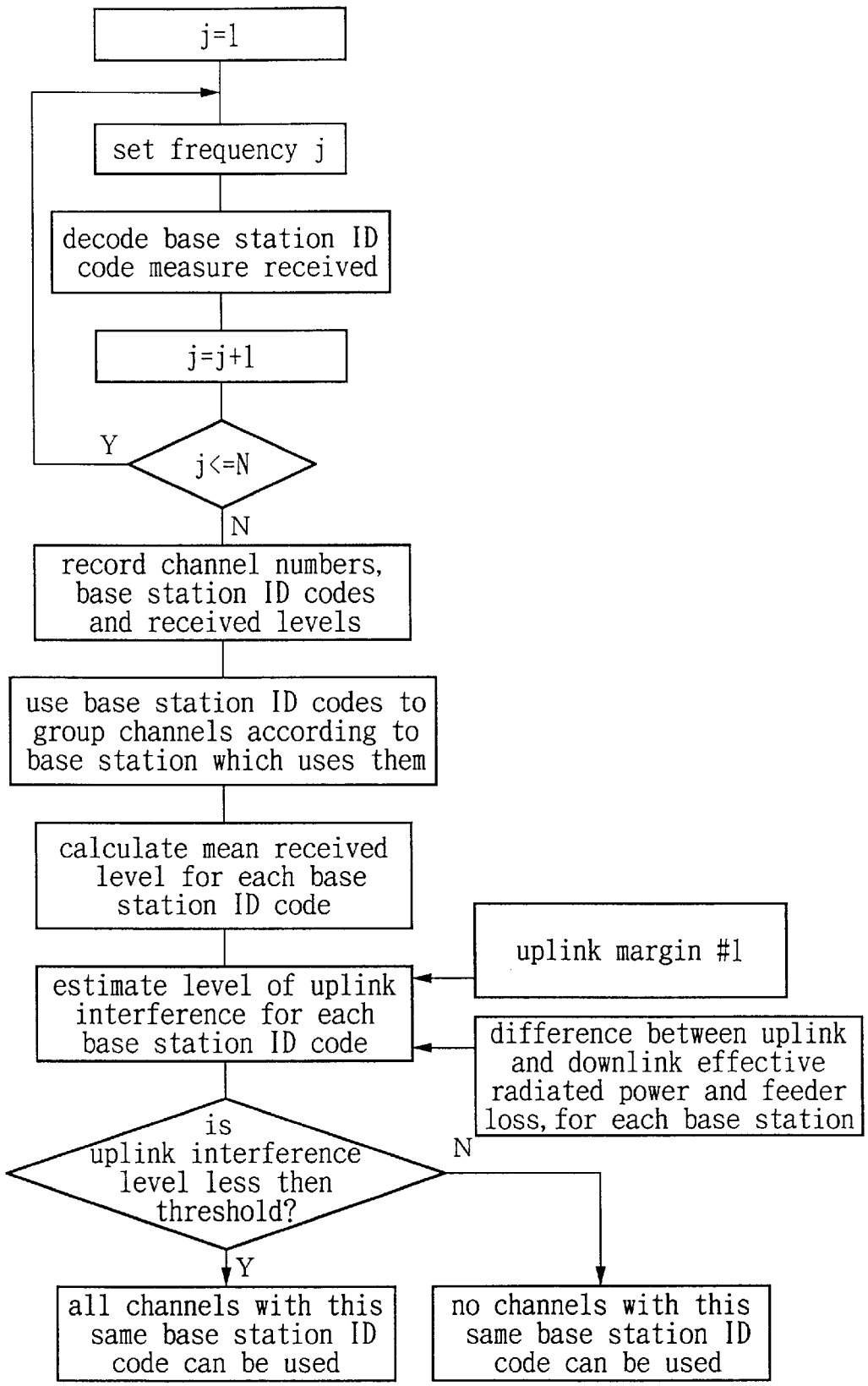
FIG. 19 shows the control flow of the controller.

FIG. 19 is a flowchart of the control of field monitoring receiver 72 by controller 75. This control involves the following:

(1) First of all, controller 75 causes field monitoring receiver 72 to be tuned to a frequency j. The received level is then measured and the base station identification code decoded. These operations are performed for all channels (j=1, 2, . . . , N). Each channel number is grouped together with a base station identification code and a received level (downlink level), and these sets of values are recorded in the memory of controller 75.

Figure 20:
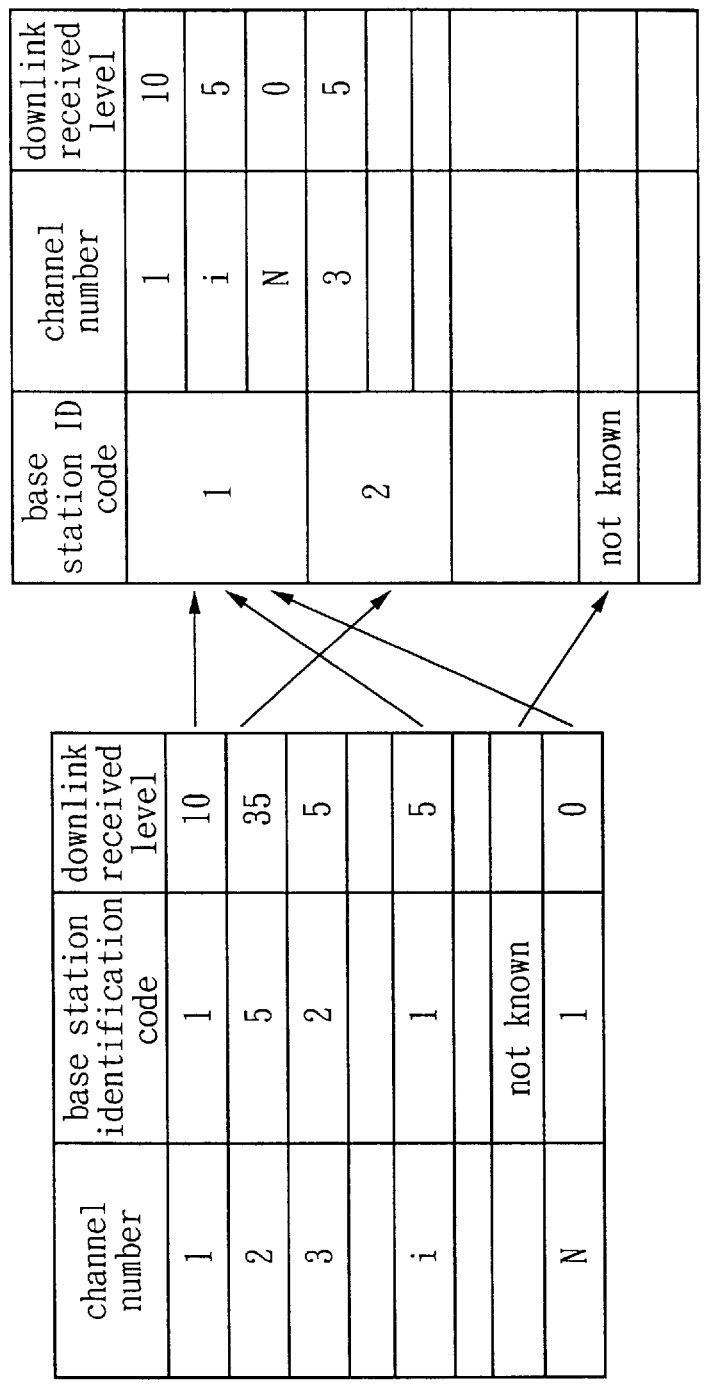
FIG. 20 shows an example of recorded measurement results, and of grouping into channels used by the same base station.

(2) When the decoding of the base station identification codes is completed for all channels, controller 75 sorts the contents recorded in the memory by base station identification code, thereby grouping channels in accordance with the base station that uses them. This status is shown in FIG. 20.

(3) Next, on the basis of the results of this grouping, controller 75 obtains the mean received level of channels fk,i of a given base station 1-k and calculates the mean value Eav of the received level from that base station of system A, given by:

$$Eav = (\Sigma f k, i)/m.$$

It then estimates the level of uplink interference at that base station of system A by adding the difference between the uplink and downlink effective radiated power and feeder loss, plus a predetermined uplink margin, to the calculated mean value Eav of the received level. It then compares this value with a predetermined threshold, and if it does not exceed the threshold, decides that no interference is applied to that base station of system A. Controller 75 then collectively decides that all the channels fk,i (i=1, 2, . . . , m) used by this base station of system A can be used, and records this decision in a channel use decision table. An example of this channel use decision table is given in FIG. 21.

Given a channel use decision table obtained in this way, base station controller 33 uses the required number of channels from this table and allocates them to transceiver 32, the order in which they are used starting from the lowest estimated uplink interference level. If two levels are the same, the channel with the smaller channel number can for example be used first.

The foregoing operations are performed at regular intervals, and the channel use decision table is updated.

The example given in the foregoing explanation used the mean value as the representative value of the received level from a base station. However, a statistical value such as the 50% median may alternatively be used.

In the foregoing control flow, it was assumed that the base station identification code can invariably be decoded. However, grouping cannot be performed in the case of channels for which, for one reason or another, the base station identification code cannot be decoded, for example, in the case of channels that are not in use. Such channels should be dealt with as individual base stations with a single channel.

Thus, because the uplink interference level for channels used by a given base station is estimated collectively by obtaining a representative value for the downlink interference level, it is possible to reduce the uplink margin that is added when estimating the uplink interference, and to increase the number of radio channels that can be used in the base stations of system B.

Because synchronization has to be established, etc., demodulating a signal generally takes longer than simply measuring the received level. For this reason, when the radio channel that can be used has to be decided rapidly, e.g., at system startup for the base station of system B, or when the field monitor has been reset, the monitoring function will have to have a rapid measurement time. An example of such a configuration will now be explained.

Figure 22:
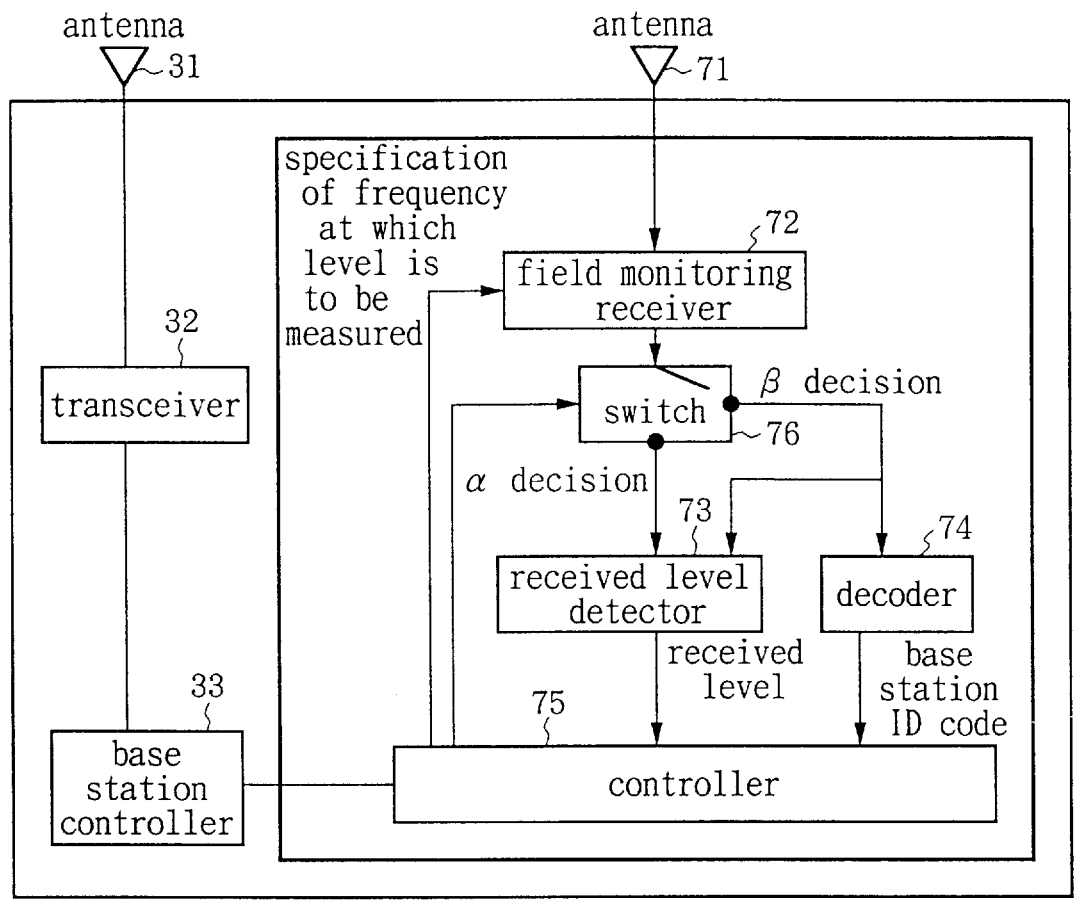
FIG. 22 is a block diagram showing an example of another configuration for a base station and a field monitor.

FIG. 22 shows an example of the configuration of base station 3 and field monitor 7. Although it is desirable for field monitor 7 to be implemented as a function of the mobile stations, in the configuration shown here is a separate device from the mobile stations and is installed in a common facility with base station 3. As in the configuration shown in FIG. 17 and FIG. 18, base station 3 has antenna 31, transceiver 32 and base station controller 33; while field monitor 7 has antenna 71, field monitoring receiver 72, received level detector 73, decoder 74 and controller 75. Field monitor 7 also has switch 76 which can switch between a state in which the output of field monitoring receiver 72 is supplied to received level detector 73 only, and a state in which it is supplied to both received level detector 73 and decoder 74.

Controller 75 has a function which detects the received level only and decides whether or not a channel can be selected and used (hereinafter, this will be called the "$\alpha$ decision"), and a function which decides whether or not a channel can be selected and used on the basis of the received level and the decoded base station identification code (hereinafter, this will be called the "$\beta$ decision"). For an $\alpha$ decision, switch 76 is switched so that the output of field monitoring receiver 72 is supplied to received level detector 73; while for a $\beta$ decision, switch 76 is switched so that the output of field monitoring receiver 72 is supplied to received level detector 73 and decoder 74. Because a $\beta$ decision is made after the signal is decoded, it takes longer to make than an $\alpha$ decision, which only involves measurement of the received level.

The configuration given in the present example employs a common field monitoring receiver 72, received level detector 73 and controller 75 in its implementation of the two monitoring functions, i.e., the $\alpha$ decision and the $\beta$ decision. However, it is also feasible to provide these separately. Moreover, instead of switching the output of field monitoring receiver 72 by means of switch 76, it is also feasible to switch the outputs of received level detector 73 and decoder 74 by software.

Figure 23:
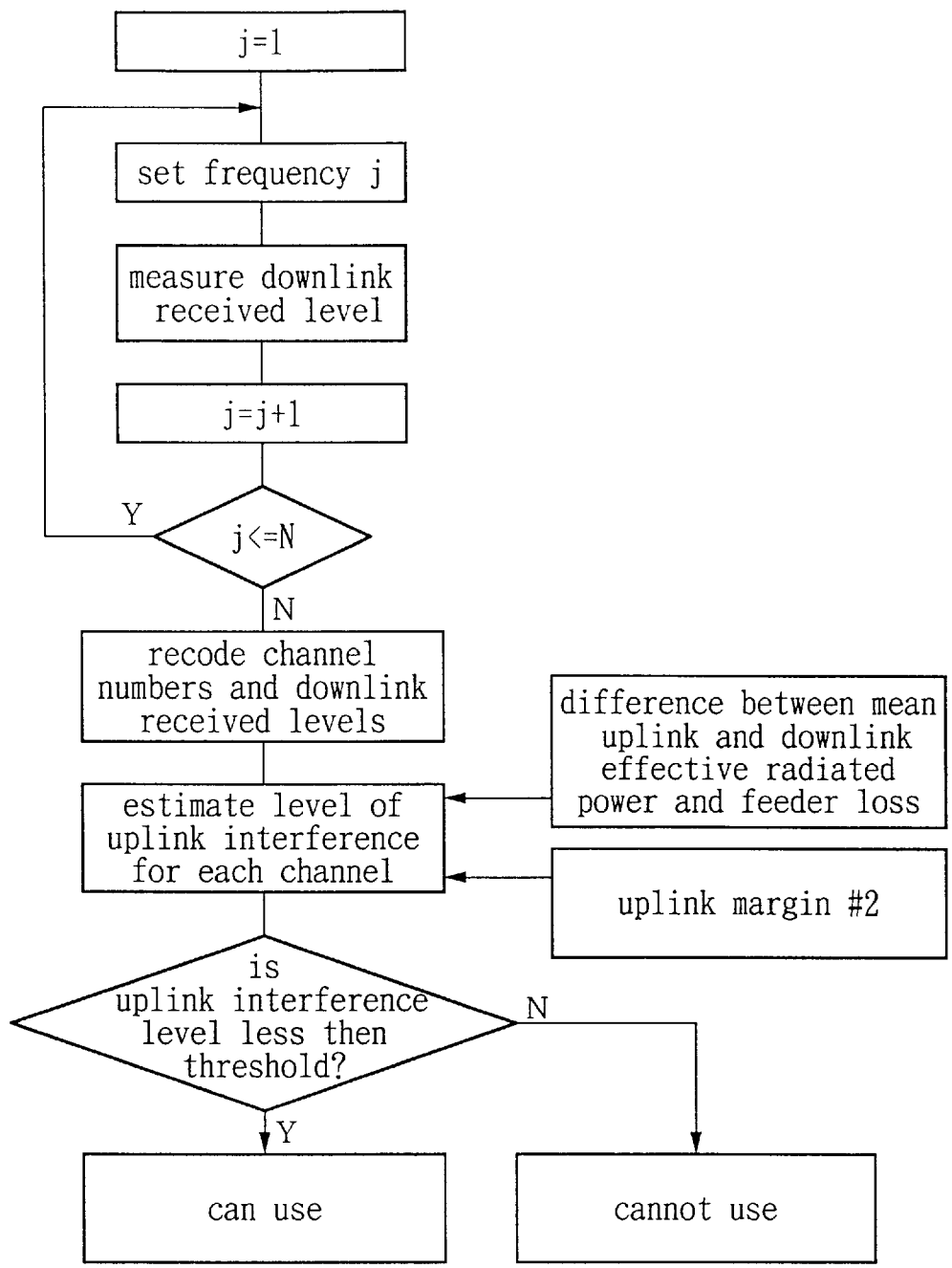
FIG. 23 shows the control flow for the α decision.

FIG. 23 shows the control flow for the $\alpha$ decision. The control flow for the $\beta$ decision is exactly the same as that given in FIG. 19, and therefore the following explanation concerns the control flow for the $\alpha$ decision. In the $\alpha$ decision:

(1) First of all, controller 75 causes field monitoring receiver 72 to be tuned to a frequency j, and the received level is measured. These operations are performed for all channels (j=1, 2, . . . , N). The channel numbers and received levels are grouped together and recorded in memory in controller 75.

(2) Next, the level of uplink interference at a base station of system A is estimated by adding the difference between the uplink and downlink effective radiated power plus a predetermined uplink margin (this differs from the uplink margin in the β decision) to the measured received level. This value is then compared with a predetermined level threshold, and if it does not exceed this threshold, it is decided that no interference is applied to that base station of system A. This decision is then recorded in a channel use decision table. An example of this table is given in FIG. 24.

Figures 24, 25:
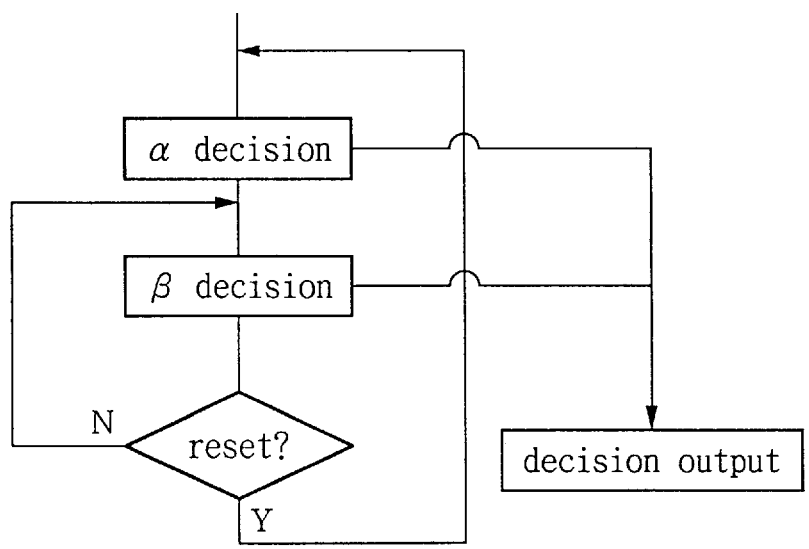
FIG. 24 shows an example of a table showing whether or not channels can be used.
FIG. 25 is a flowchart showing an example of the overall control actions of the controller.

FIG. 25 is a flowchart showing the overall control actions of controller 75. When the field monitor starts to operate, or when it has been reset, controller 75 actuates the fast measurement time monitoring function, i.e., the α decision function. However, once a decision regarding whether or not to use a channel has been completed, controller 75 actuates the monitoring function which, although it takes longer to make a measurement, can select more channels that can be used, i.e., the β decision function.

With a configuration of this sort, at system startup of the base station of system B (when the field monitor begins to operate) or when the field monitor has been reset, it is possible to select channels that can be used by means of a monitoring function (the α decision) with which, although the number of channels that can be used is small, measurement time is fast. Then, when a fixed time has elapsed, more channels that can be used can be selected by means of a monitoring function (the β decision) with which, although measurement time is slower, more channels that can be used can be selected.

Figure 26:
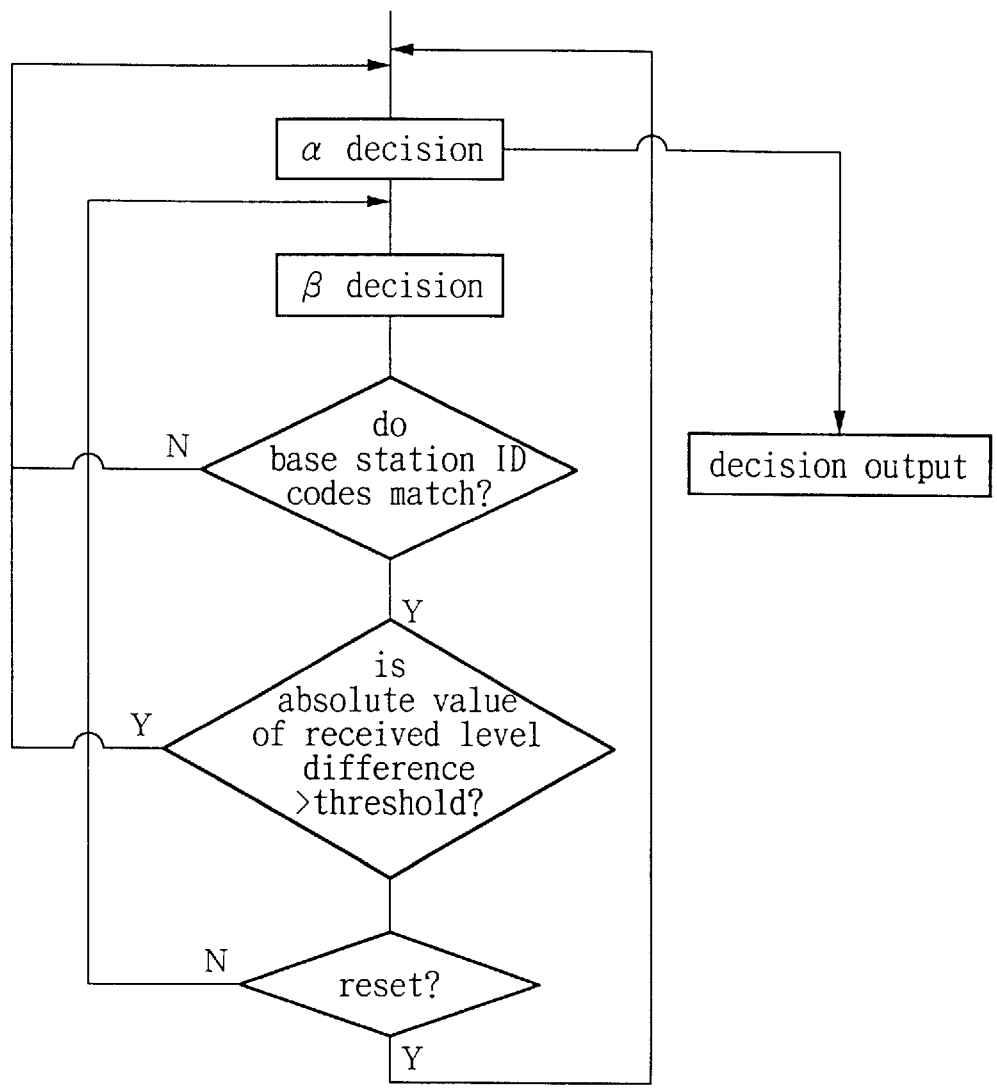
FIG. 26 is a flowchart showing another example of the overall control actions of the controller.

FIG. 26 shows another example of the overall control actions of controller 75. Here, the fast measurement time monitoring function (the α decision) is made to operate in any of the following situations: when the operation of the field monitor begins; when the field monitor is reset; when the base station identification code of the demodulated channel has changed relative to the base station identification code that was monitored the previous time; and when the difference between the newly measured received level and the previously measured received level of the same channel exceeds a predetermined threshold.

By virtue of this arrangement, even in a transient state, for example, when the channel of a base station of system A has suddenly been changed, a channel that can be used can be selected by the fast measurement time α decision, and so it will be possible to select rapidly a channel that does not interfere with that base station of system A. Moreover, in a stable state in which there is no change in the frequency of the channels of the base stations of system A, the β decision function is operative, i.e., although the measurement time is slower, more channels that can be used can be selected, and therefore more channels will be able to be used.

As has been explained above, the effect of this second embodiment of the invention is that when the uplink interference level is estimated from the downlink interference level when the received level fluctuations are characteristic of a selective fading environment, the uplink margin that is added can be restricted to a necessary minimum, and therefore the number of radio channels that can be used can be increased.

We claim:

1. A mobile communication system comprising:
a first group of base stations belonging to a first mobile communication system;
a service area of the first mobile communication system comprising a plurality of radio zones, each centered on one of said base stations of said first group;
a second group of base stations belonging to a second mobile communication system independent of the first mobile communication system provided in the service area of said first mobile communication system;
each of the base stations of this second group including:
a means which selects control channels and traffic channels from among channels in which a level of mutual interference involving base stations of the first group and the base stations of the second group is within a predetermined value; and
a means which allocates the selected channels to mobile stations belonging to the second mobile communication system and which are located within that base station's area;
wherein:
the selecting means includes:
a means which assigns channels to said mobile stations belonging to the second mobile communication system and commands field strength measurements; and
a means which receives from said mobile stations information relating to the results of the field strength measurements of the assigned channels;
each of said mobile stations belonging to the second mobile communication system includes:
a means which tunes the received frequency to the channel assigned by the command means and measures its field strength; and
a means which reports the measured results to the receiving means;
a radio band that can be used by the first mobile communication system is divided into a plurality of channel groups which are allocated to the first group of base stations in such manner that they can be re-used in mutually separated radio zones;
each of the first group of base stations includes a transmitting means which gives each channel a base station identification code for identifying that base station;
each of the mobile stations belonging to the second mobile communication system includes:
a means which demodulates radio signals from the first group of base stations and identifies their base station identification codes; and
a means which transmits, by means of the reporting means, the identified base station identification codes, along with the results measured by the means which measures the field strength, to the receiving means; and
the selecting means includes:
a means which, on the basis of the base station identification codes received by the receiving means, groups these channels according to the base stations which use them, and which for each group performs operations on the field strengths measured in channels belonging to that group to thereby obtain a single representative value; and
a means which decides, in channel group units, and on the basis of the representative value obtained by this means, whether or not a channel can be selected and used.

2. A mobile communication system as set forth in claim 1, wherein the selecting means also includes:
a means which decides, in channel units, and from the measured value of the field strength of each channel, whether or not a channel can be selected and used; and
a means which preferentially actuates the means which decides in channel units when the identification means has identified another base station identification code, or when the difference between the field strength newly measured for a given channel and the field strength of that channel measured the previous time exceeds a predetermined threshold.

3. Mobile communication system as set forth in claim 1, wherein said operations performed on the field strengths includes calculating a mean value of the field strengths.

4. Mobile communication system as set forth in claim 1, wherein said operations performed on the field strengths includes calculating a median value of the field strengths.

5. A mobile communication system comprising:

a first group of base stations belonging to a first mobile communication system;

a service area of the first mobile communication system comprising a plurality of radio zones, each centered on one of said base stations of said first group;

a radio band that can be used by the first mobile communication system being divided into a plurality of channel groups which are allocated to the first group of base stations in such manner that they can be re-used in mutually separated radio zones;

each of said first group of base stations includes a transmitting means which gives each channel a base station identification code for identifying that base station;

a second group of base stations belonging to a second mobile communication system independent of the first mobile communication system provided in the service area of the first mobile communication system;

each of the base stations of said second group including:
  a means which selects control channels and traffic channels from among channels in which a level of mutual interference involving base stations of the first group and the base stations of the second group is within a predetermined value; and
  a means which allocates the selected channels to mobile stations belonging to the second mobile communication system and which are located within that base station's area; and a field monitoring means connected to the selecting means including:
  means which demodulates the signals from the first group of base stations and identifies their base station identification codes;
  means which, on the basis of the identified base station identification codes, groups these channels according to the base stations which use them, and which for each group performs operations on the field strengths measured in channels belonging to that group to thereby obtain a single representative value; and
  means which decides, in channel group units, and on the basis of the representative value obtained by this means, whether or not a channel can be selected and used.

6. Mobile communication system as set forth in claim 5, wherein:

the field monitoring means further comprises:
  a means which decides in channel units, and from the measured value of the field strength of each channel, whether or not a channel can be selected and used; and
  a means which, when the field monitoring means starts up or after it has been reset, preferentially actuates the means which decides in channel units, and subsequently preferentially actuates the means which decides in channel group units.

7. Mobile communication system as set forth in claim 6, wherein the actuating means includes a means which actuates the means which decides in channel units either when the identifying means has identified a different base station identification code, or when the difference between the field strength newly measured for a given channel and the field strength of that channel measured the previous time exceeds a predetermined threshold.

8. Mobile communication system as set forth in claim 5, wherein said operations performed on the field strengths includes calculating a mean value of the field strengths.

9. Mobile communication system as set forth in claim 5, wherein said operations performed on the field strengths includes calculating a median value of the field strengths.

* * * * *

UNITED STATES PATENT AND TRADEMARK OFFICE
CERTIFICATE OF CORRECTION

PATENT NO. : 5,862,487
DATED : January 19, 1999
INVENTOR(S) : FUJII et al.

It is certified that error appears in the above-identified patent and that said Letters Patent is hereby corrected as shown below:

Please insert missing data as follows:

ON THE TITLE PAGE:

[63] Continuation of application No. PCT/JP96/00122 filed Jan. 24, 1996.

ON THE SPECIFICATION PAGE:

At top of column 1, insert --This is a continuation of International Application No. PCT/JP96/00122 filed Jan. 24, 1996.

Signed and Sealed this

Eleventh Day of April, 2000

Attest:

Q. TODD DICKINSON

*Attesting Officer*   *Director of Patents and Trademarks*